US012395556B2

(12) United States Patent
Varda et al.

(10) Patent No.: US 12,395,556 B2
(45) Date of Patent: Aug. 19, 2025

(54) STATE MANAGEMENT AND STORAGE WITH POLICY ENFORCEMENT IN A DISTRIBUTED CLOUD COMPUTING NETWORK

(71) Applicant: CLOUDFLARE, INC., San Francisco, CA (US)

(72) Inventors: Kenton Taylor Varda, Austin, TX (US); Alex Dwane Robinson, Austin, TX (US); Brett Joseph Hoerner, Austin, TX (US); Loren Cody Koeninger, Austin, TX (US); Gregory Richard McKeon, New York, NY (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/766,015

(22) Filed: Jul. 8, 2024

(65) Prior Publication Data
US 2024/0364783 A1 Oct. 31, 2024

Related U.S. Application Data

(63) Continuation of application No. 17/566,539, filed on Dec. 30, 2021, now Pat. No. 12,034,805, which is a
(Continued)

(51) Int. Cl.
H04L 67/1097 (2022.01)
H04L 9/40 (2022.01)
(Continued)

(52) U.S. Cl.
CPC .......... H04L 67/1097 (2013.01); H04L 63/10 (2013.01); H04L 67/01 (2022.05); H04L 67/1021 (2013.01)

(58) Field of Classification Search
None
See application file for complete search history.

(56) References Cited

U.S. PATENT DOCUMENTS 5,892,900 A   4/1999 Ginter et al.
8,458,125 B1  6/2013 Chong et al.
(Continued)

FOREIGN PATENT DOCUMENTS

EP  1914655 A2  4/2008
EP  3933630 A1  1/2022
(Continued)

OTHER PUBLICATIONS

Brooks et al. A Component Architecture for the Internet of Things. Proceedings of the IEEE. vol. 106, Issue 9, 2018. pp. 1527-1542 (Year: 2018).*
(Continued)

Primary Examiner — Jeffrey R Swearingen
(74) Attorney, Agent, or Firm — NICHOLSON DE VOS WEBSTER & ELLIOTT LLP

(57) ABSTRACT

An object worker is instantiated at a compute server of a distributed cloud computing network, where the object worker includes a single instantiation of a piece of code that solely controls reading/writing to an object. An external communication policy is associated with the first object worker. If the external communication policy does not allow the object worker to send communications with the object to an asset that is external to the distributed cloud computing network, the communication is prevented from being sent. If the external communication policy allows the object worker to send communications with the object to the asset that is external to the distributed cloud computing network, the communication is sent from the first object worker to the asset.

18 Claims, 6 Drawing Sheets

Related U.S. Application Data continuation of application No. 17/484,807, filed on Sep. 24, 2021, now Pat. No. 11,240,309.

(60) Provisional application No. 63/121,793, filed on Dec. 4, 2020.

(51) Int. Cl.
*H04L 67/01* (2022.01)
*H04L 67/1021* (2022.01)

(56) References Cited

U.S. PATENT DOCUMENTS

| | | | |
|---|---|---|---|
| 8,601,134 | B1 | 12/2013 | Sorenson et al. |
| 8,639,921 | B1 | 1/2014 | Sorenson et al. |
| 8,793,343 | B1 | 7/2014 | Sorenson et al. |
| 9,411,671 | B1 | 8/2016 | Johnson et al. |
| 9,628,473 | B1 | 4/2017 | Odom et al. |
| 9,852,149 | B1 | 12/2017 | Taylor et al. |
| 10,152,467 | B2 | 12/2018 | Chan et al. |
| 10,333,711 | B2 | 6/2019 | Fleischman et al. |
| 10,498,812 | B1 * | 12/2019 | Varda ............... H04L 67/34 |
| 10,819,576 | B2 | 10/2020 | Seshadri et al. |
| 11,070,621 | B1 | 7/2021 | Tornow et al. |
| 2004/0107342 | A1 | 6/2004 | Pham et al. |
| 2009/0282273 | A1 | 11/2009 | Hamilton et al. |
| 2013/0117252 | A1 | 5/2013 | Samaddar et al. |
| 2014/0123316 | A1 | 5/2014 | Leggette et al. |
| 2014/0149794 | A1 | 5/2014 | Shetty et al. |
| 2014/0215574 | A1 | 7/2014 | Erb et al. |
| 2017/0318093 | A1 | 11/2017 | Muhlestein et al. |
| 2017/0330149 | A1 | 11/2017 | Hunter et al. |
| 2018/0114015 | A1 | 4/2018 | Nuseibeh et al. |
| 2018/0114334 | A1 | 4/2018 | Desai et al. |
| 2018/0146069 | A1 | 5/2018 | Du et al. |
| 2020/0026732 | A1 | 1/2020 | Bequet et al. |
| 2020/0053397 | A1 | 2/2020 | Zhou |
| 2020/0204651 | A1 | 6/2020 | Xi et al. |
| 2021/0026611 | A1 | 1/2021 | Bequet et al. |
| 2021/0406381 | A1 | 12/2021 | Heisrath et al. |

FOREIGN PATENT DOCUMENTS

| | | |
|---|---|---|
| KR | 10-2018-0032524 A | 3/2018 |
| WO | 2017/096920 A1 | 6/2017 |

OTHER PUBLICATIONS

Etchevers et al. Automated Configuration of Legacy Applications in the Cloud. 2011 Fourth IEEE International Conference on Utility and Cloud Computing. pp. 170-177. (Year: 2011).*

Ayache et al., "Access Control Policies Enforcement in a Cloud Environment: Openstack", IEEE, 2015 11th International Conference on Information Assurance and Security (IAS), 2015, pp. 26-31 (7 pages).

Cabrera et al., "Softwarization and Network Coding in the Mobile Edge Cloud for the Tactile Internet", Proceedings of the IEEE, 2018, pp. 1-14.

European search report and Search Opinion, EP App. No. 21901618.5, Oct. 10, 2024, 06 pages.

Ex Parte Quayle Action, U.S. Appl. No. 17/566,539, Dec. 22, 2023, 6 pages.

Final Office Action, U.S. Appl. No. 17/346,746, May 2, 2022, 16 pages.

How Sandstorm Works: Containerize data, not services, Feb. 28, 2019, 12 pages, downloaded at: https://web.archive.org/web/20190228074058/https:/sandstorm.io/how-it-works.

International Preliminary Report on Patentability, PCT App. No. PCT/US2019/063428, Dec. 9, 2021, 6 pages.

International Search Report and Written Opinion, PCT App No. PCT/US2019/063428, Mar. 27, 2020, 9 pages.

International Search Report and Written Opinion, PCT App. No. PCT/US2021/062071, Apr. 15, 2022, 8 pages.

Joshua Fox, "When is a Singleton not a Singleton?", Java World, Jan. 2001, 9 pages.

Non-Final Office Action, U.S. Appl. No. 16/696,879, Aug. 18, 2020, 10 pages.

Non-Final Office Action, U.S. Appl. No. 17/346,746, Feb. 22, 2022, 13 pages.

Non-Final Office Action, U.S. Appl. No. 17/958,087, Mar. 15, 2023, 19 pages.

Non-Final Office Action, U.S. Appl. No. 18/508,201, Jul. 17, 2024, 16 pages.

Notice of Allowance for U.S. Appl. No. 16/425,415, mailed Aug. 1, 2019, 13 pages.

Notice of Allowance, U.S. Appl. No. 16/425,415, Oct. 17, 2019, 5 pages.

Notice of Allowance, U.S. Appl. No. 16/696,879, Feb. 11, 2021, 9 pages.

Notice of Allowance, U.S. Appl. No. 17/346,746, Sep. 13, 2022, 7 pages.

Notice of Allowance, U.S. Appl. No. 17/484,807, Dec. 15, 2021, 8 pages.

Notice of Allowance, U.S. Appl. No. 17/566,539, Mar. 13, 2024, 5 pages.

Notice of Allowance, U.S. Appl. No. 17/566,539, Mar. 20, 2024, 12 pages.

Notice of Allowance, U.S. Appl. No. 17/958,087, Jul. 12, 2023, 7 pages.

* cited by examiner

STATE MANAGEMENT AND STORAGE WITH POLICY ENFORCEMENT IN A DISTRIBUTED CLOUD COMPUTING NETWORK

CROSS-REFERENCE TO RELATED APPLICATIONS

This application is a continuation of Ser. No. 17/566,539, filed Dec. 30, 2021, which is a continuation of U.S. application Ser. No. 17/484,807, filed Sep. 24, 2021, now U.S. Pat. No. 11,240,309, which claims the benefit of U.S. Provisional Application No. 63/121,793, filed Dec. 4, 2020, which is hereby incorporated by reference.

FIELD

Embodiments of the invention relate to the field of computing; and more specifically, to state management and storage with policy enforcement in a distributed cloud computing network.

BACKGROUND

There are several different ways to store data. A common approach is to use a monolithic database model that is fundamentally centralized. These databases are sometimes claimed to be distributed, but they either are based on a global synchronization procedure (e.g., consistent and partition tolerant) or eventual consistency through merging changes (e.g., highly available and partition tolerant). Global synchronization can be slow especially as the distributed database and the number of nodes grows. Eventual consistency is difficult to do correctly and is error prone.

SUMMARY

A compute server of a distributed cloud computing network receives a request for an object that is to be handled by an object worker, where the object worker includes a single instantiation of a piece of code that solely controls reading/writing to the object. Policies are accessed that are applicable for processing the object. If the policies do not allow the object worker to be instantiated on the compute server, the object worker will not be instantiated, and the request will not be processed at that compute server. If the policies allow the object worker to be instantiated on the compute server, the object worker is instantiated, and the request is processed.

The policies may include an object worker instantiation policy, an object worker access policy, an external communication policy, an encryption policy, and a logging policy. The object worker instantiation policy may specify the condition(s) in which an object worker can be instantiated and/or where the object worker can be instantiated. The object worker access policy may specify the condition(s) in which an instantiated object worker can be accessed. The external communication policy may specify the condition(s) in which communication can be sent to assets on an external network (e.g., over the internet) and/or object workers that belong to another organization or domain. The encryption policy may specify the specific type of encryption to be used for an object worker. The logging policy may specify the logging that is to be done for the object worker.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
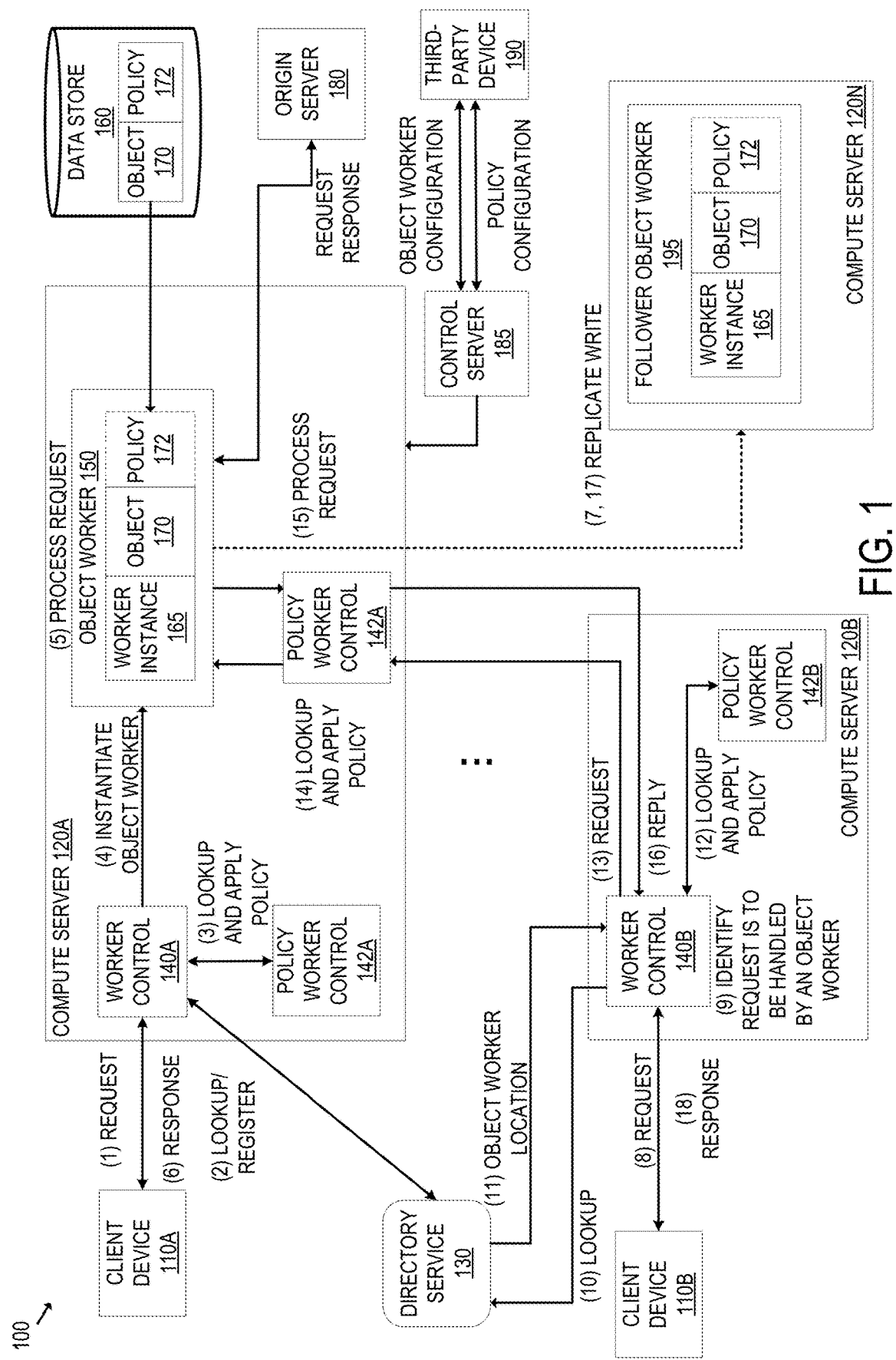
FIG. 1 illustrates an exemplary embodiment for state management and storage with policy enforcement in a distributed cloud computing network according to an embodiment.

A method and apparatus for state management and storage with policy enforcement in a distributed cloud computing network is described. Data is separated into one or more units referred herein as objects. For instance, objects may be created in a way that they tend to be accessed by the same set or set of clients. By way of example, each document of a collaborative document editing system may be a separate object. In an embodiment, a developer splits their data into objects in a way that they choose. A single object is owned by a single instantiation of a piece of code that can read and/or modify the object while the single piece of code is executing. Other entities that wish to read and/or modify the object communicate with the single instantiation of the piece of code that owns the object.

As referred herein, an object worker includes a combination of the single instantiation of a piece of code and the object that belongs to the single instantiation of the piece of code. Each instance of an object worker has its own private and persistent data that the object worker can read and/or modify and which no other object worker can directly access. Thus, the single instantiation of the piece of code solely controls reading and/or writing access to the object in which it controls. The piece of code can be, for example, a piece of JavaScript or other interpreted language, a WebAssembly (WASM) compiled piece of code, or other compiled code. In an embodiment, the piece of code is written against standard Web Platform APIs such as the W3C standard Service Worker API for receiving HTTP requests. For purposes of this description, each piece of code is referred to as an object worker script, and each single instantiation of the piece of code is referred to as an instantiated object worker script. The object of an object worker may be persistently located in storage. An object worker locks the data such that it is the sole owner of the data while it is being executed. Other entities that wish to interact with the data send messages to the object worker that owns the data.

Object workers may be executed in a distributed cloud computing network. The distributed cloud computing network includes multiple compute servers that are geographically distributed (e.g., in different locations throughout the world). There may be hundreds of compute servers that are geographically distributed in different points-of-presences (PoPs). An object worker may migrate between different compute servers. For instance, an object worker may migrate to a particular compute server because that compute server is the one physically closest to the user that is interacting with the data of the object worker. In some embodiments, an object worker may migrate to a particular compute server because that compute server is the one physically closest to an external server or other resource with which that object worker frequently interacts, such as an origin server.

In some embodiments, the distributed cloud computing network may enforce one or more policies in conjunction with an object worker. For instance, one or more of the following polices may be enforced: an object worker instantiation policy, an object worker access policy, an external communication policy, an encryption policy, and a logging policy. The one or more policies may be defined by the entity that manages the object worker (e.g., the owner of the domain of the object worker), by the distributed cloud computing network, or by end users.

The object worker instantiation policy specifies the condition(s) in which an object worker can be instantiated and/or where the object worker can be instantiated. The object worker instantiation policy for an object worker may be triggered when a request triggers an instantiation of the object worker and/or when an object worker is migrated to another compute server. The object worker instantiation policy may specify location(s) in which the object worker is allowed and/or not allowed to be instantiated, times in which the object worker is allowed and/or not allowed to be instantiated, characteristic(s) of the server and/or data center in which the object worker is allowed and or not allowed to be instantiated, location(s) of client devices that are allowed and/or not allowed to cause the object worker to be instantiated, authenticated identities of users that are allowed and/or not allowed to cause the object worker to be instantiated, roles of users that are allowed and/or not allowed to cause the object worker to be instantiated, and/or characteristic(s) of client devices that are allowed and/or not allowed to cause the object worker to be instantiated.

The locations may include one or more of: legal jurisdiction(s) in which the object worker is allowed and/or not allowed to be instantiated, a region in which the object worker is allowed and/or not allowed to be instantiated, and a general location in which the object worker is allowed and/or not allowed to be instantiated. For instance, a policy may specify that an object worker is not allowed to be instantiated at a compute server located outside of the United States and/or instantiated from a request received from a client that is located outside of the United States.

The characteristic(s) of the server and/or data center include one or more of: a data center tier type, a server manufacturer, a server/data center certification (e.g., ISO-certified, FedRAMP, ITAR, etc.), and server generation. For example, a policy may specify that an object worker is only allowed to be instantiated at a data center that is ITAR compliant.

The client device location may include one or more of: legal jurisdiction(s) for which client devices are allowed and/or not allowed to trigger the instantiation of an object worker, a region for which client devices are allowed and/or not allowed to trigger the instantiation of an object worker, and a general location for which client devices are allowed and/or not allowed to trigger the instantiation of an object worker. The location of the client device may be determined through GPS of the client device or through geolocation databases based on IP address.

In some embodiments, the system performs or receives authentication status of users of the client devices that may identify users for a particular customer or application. For instance, an application may be defined that has users, roles, and/or groups (e.g., team, department, company, etc.). The application may define the owner of each object and the authentication requirements of that object (e.g., certain authenticated users are allowed/not allowed, group of authenticated users are allowed/not allowed). The user may provide credentials that can be authenticated by the system or through external authentication. In such embodiments, the authenticated identities of users that are allowed and/or not allowed to cause the object worker to be instantiated, and/or the roles of users that are allowed and/or not allowed to cause the object worker to be instantiated may be set by policy. As an example, a policy may specify that authenticated users from the finance department are only allied to see objects that are tagged as being financial data. If a user is authenticated as being Alice and Alice is part of the finance department and the requested object is tagged as financial data, the object worker to process that object meets the policy for instantiation.

The characteristic(s) of the client devices may include: the type of client device (e.g., mobile device, laptop, desktop) that are allowed and/or not allowed to trigger the instantiation of an object worker, the manufacturer of client devices that are allowed and/or not allowed to trigger the instantiation of an object worker, the user agent of client devices that are allowed and/or not allowed to trigger the instantiation of an object worker, IP addresses of client devices that are allowed and/or not allowed to trigger the instantiation of an object worker, and device posture of client devices that are allowed and/or not allowed to trigger the instantiation of an object worker.

The object worker access policy specifies the condition(s) in which an instantiated object worker can be accessed. The object worker access policy may be triggered when a request for access to an object policy is received. The object worker access policy may specify location(s) of client devices for which access to the object worker is allowed and/or not allowed, authenticated identities of users for which access to the object worker is allowed and/or not allowed, roles of authenticated users for which access to the object worker is allowed and/or not allowed, access rights of authenticated users, and/or characteristic(s) of client devices for which access to the object worker is allowed and/or not allowed. The location may be legal jurisdiction(s), a region, and/or a general location. The location of the client device may be determined through GPS coordinates provided by the client device or through geolocation databases based on IP address. The authentication of users may be performed by the system or by an external system and the entity managing the object may define the owner of each object and the authentication requirements of that object. The characteristic (s) of the client devices may include: the type of client device, the client device manufacturer, the user agent, IP address of the client device, and/or device posture of the client device. By way of example, the object worker access policy may specify that only clients from a certain jurisdiction (e.g., the United States) can access (e.g., interact with by sending a message to the object worker and/or receiving a message from the object worker). As another example, the object worker access policy may specify that only authenticated clients with particular credentials are allowed access to the object worker. As another example, authenticated users and/or groups of users may be assigned different access rights for the object (e.g., read, write, modify, delete, execute, etc.) that may be enforced by policy.

The external communication policy specifies the condition(s) in which communication can be sent to assets on an external network (e.g., over the internet) and/or object workers that belong to another organization or domain. The external communication policy may be triggered when an external communication is requested to be sent or received. The external communication policy may specify external domains and/or IP addresses for which external communication is allowed and/or disallowed, authenticated identities of users for which external communication is allowed and/or disallowed, roles of authenticated users for which external communication is allowed and/or disallowed, access rights of authenticated users, characteristic(s) of client devices that are allowed and/or not allowed for external communication, and/or characteristic(s) of other object workers for which external communication is allowed or disallowed. The characteristic(s) of client devices may include the type of client device, the client device manufacturer, the user agent, IP address of the client device, and/or device posture of the client device. The characteristic(s) of other object workers may include a classification level, a domain, and/or a location of the other object worker for which external communication is allowed. For instance, the external communication policy may specify that an object that is tagged with a secret classification level may send messages to objects tagged with top secret classification level; and objects tagged with top secret classification level cannot send messages to objects tagged with secret classification level.

The encryption policy specifies the specific type of encryption to be used for an object worker. For instance, the policy may specify that a particular encryption algorithm be used. For example, the use of a Federal Information Processing Standards (FIPS) compliant encryption algorithm may be specified in an encryption policy and enforced at the distributed cloud computing network.

The logging policy specifies the logging that is to be done for the object worker. The logging policy may be triggered upon a request being processed that triggers access of the object worker. The logging policy may specify what is to be logged and/or what is not to be logged including IP addresses, user agent information, URL, headers, authenticated user identity, performance metrics, application-specific notes on what happened when the request was processed, timestamps, and other information that can be directly observed from the request and/or derived from processing the request.

For object level policy, the set of one or more policies may be stored as metadata associated with an object. Each different policy may be stored in their own metadata storage. In an embodiment, a policy worker control enforces the policies. The policy worker control may be a script that determines whether a policy has been triggered and accesses the policy metadata. In some embodiments, the application is not able to access the policy metadata of an object, and the policy worker control cannot access the data of the object. For user level policy, the set of one or more policies may be stored as per-user metadata. The policy worker control has access to the per-user metadata storage.

In some embodiments, enforcement of policies may include blocking or modifying communication, and/or preventing an object worker from being instantiated at a certain server or data center.

In some embodiments, the single instantiation of the piece of code and/or the object are automatically migrated to be close to the clients that are accessing the object. For instance, if not currently running, the single piece of code may be instantiated at a first server of the distributed cloud computing network that is close to the client that is requesting access to the object. When access to that object is complete, the single piece of code may be instantiated at a second server of the distributed cloud computing network that is close to a subsequent client that is requesting access to the object.

In some embodiments, the single instantiation of the piece of code and/or the object are automatically migrated to be close to a particular compute server because that compute server is the one physically closest to an external server or other resource with which that object worker frequently interacts, such as the origin server. For instance, if the code makes more requests to the origin than to client devices, the piece of code and/or object may be migrated to a server of the distributed cloud computing network that is close to the origin rather than to any particular client. As an example, if the piece of code is a database connector that is accessing a database stored at an external database server, the code and/or object may be migrated to a compute server that is physically close to the database server.

In some embodiments, a customer of the distributed cloud computing network may provide configuration regarding whether to automatically migrate the piece of code and/or the object to be close to the clients or to be close to the origin.

Control over an object may be transferred. For instance, a compute server may wish to take ownership over an object. To do so, the new compute server may transmit a message requesting ownership over the object. The compute server that has ownership over the object may agree to the transfer or may not agree to the transfer. In an embodiment, transfer of ownership may be automatically determined based on the amount of time with which the object was last interacted through the owner, the number of interactions of the object over a period of time, and/or an expected number of interactions of the object.

FIG. 1 illustrates an exemplary embodiment for state management and storage in a distributed cloud computing network according to an embodiment. The system 100 includes the client devices 110A-B, the compute servers 120A-N, the data store 160, the origin server 180, the control server 185, and the third-party device 190.

Each client device is a computing device (e.g., laptop, workstation, smartphone, mobile phone, tablet, gaming system, set top box, wearable device, Internet of Things (IoT) device, etc.) that can transmit and/or receiving network traffic. Each client device may execute a client network application such as a web browser, native application, or other application that can access network resources (e.g., web pages, images, word processing documents, PDF files, movie files, music files, or other computer files).

The compute servers 120A-N are part of the distributed cloud computing network. The compute servers 120A-N are geographically distributed (e.g., in different locations throughout the world). There may be hundreds or more compute servers 120. Each compute server 120 may include one or more physical servers that are part of the same PoP. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices between the compute servers 120A-N such as routers, switches, etc.

Each of the compute servers 120A-N may be assigned a set of one or more compute server identities including a location identity, a data center identity, an identifier identity, a data center tier type identity, a server manufacturer identity, a country identity, a legal jurisdiction identity, a region identity, a server/data center certification identity (e.g., an ISO-certified identity, a FedRAMP identity, etc.), and/or a server generation identity. These identities are exemplary as the compute servers may be assigned other identities based on properties or features of the compute servers.

The location identity may identify the location in which the compute server is located. The location may be a street, a neighborhood, a city, a state, a country, a zip code, a region, GPS coordinates, a continent, or determined by a custom map that allows the customer to define the location. The data center identity may identify the data center of which the compute server is a member. The data center identity may be a number, a name, or other identifier. A data center may include multiple compute servers. The identifier identity may identify a particular compute server. Each compute server may have a unique identifier. The data center tier type identity is used for identifying the tier of the data center of which the compute server is a member. In an embodiment, there are multiple data center tiers (e.g., tier 1 to tier N) that represent the relative quality and/or security of the data center. For instance, a tier 1 data center may have relatively higher performance and/or security as compared to a tier 2 data center.

The server manufacturer identity is used to identify the manufacturer of the compute server or a particular component of the compute server (e.g., the processing system of the compute server). Different compute servers may have different manufacturers that may have different processing and/or security capabilities. The server generation identity is used to identify the generation of the compute server which may be used to determine the capabilities of that server (e.g., newer servers may have different capabilities than older servers).

The country identity is used to identify the country in which the compute server and/or data center is located. The legal jurisdiction identity identifies the legal jurisdiction in which the compute server and/or data center is located. The legal jurisdiction identity may be a state, a country, a set of countries/states that are joined together (e.g., the European Union).

The region identity is used to identify the region in which the compute server and/or data center is located. The regions may be defined by the service provider of the distributed cloud computing network and may, at least loosely, correspond with geographic regions. An example region may be Europe. Another example region is the Americas (including North and South America). The regions may also be defined by the customer of the distributed cloud computing network.

The server/data center certification identity is used to identify whether and/or which certifications the server and/or data center have (e.g., ISO-certified, FedRAMP certified). It is possible for a server and/or data center to have multiple certifications by different organizations. The certification may be made by an independent body and/or by the service provider of the distributed cloud computing network. The certifications may include whether the server and/or data center meet certain physical controls (e.g., physically secure with perimeter controls, restricted facility access, onsite security, CCTV, secured server cabinet including locks and physical tamper detection), biometric controlled facility access, whether the servers are in private cages, whether the points of ingress/egress are monitored by an intrusion detection system.

Since the compute servers 120A-N are geographically distributed, the distance between requesting client devices and the compute servers is decreased which decreases the time necessary to respond to a request. The compute servers 120A-N may operate as a reverse proxy and receive request for network resources (e.g., HTTP requests) of a domain of the origin server 180. The particular compute server 120 that receives a request from a client device may be determined by the network infrastructure according to an Anycast implementation or by a geographical load balancer. For instance, the compute servers 120A-N may have a same anycast IP address for a domain of the origin server 180. If the origin server 180 handles the domain "example.com", a DNS request for "example.com" returns an address record having the anycast IP address of the compute servers 120A-N. Which one of the compute servers 120A-N receives a request from a client device depends on which compute server 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. By way of example, the client device 110A is closest to the compute server 120A of the compute servers 120A-N and the client device 110B is closest to the compute server 120B of the compute servers 120A-N. Accordingly, requests from the client device 110A are received at the compute server 120A and requests from the client device 110B are received at the compute server 120B. In some embodiments, instead of using an anycast mechanism, a geographical load balancer is used to route traffic to the nearest compute server. The number of client devices and compute servers illustrated in FIG. 1 is exemplary. The distributed cloud computing network may include hundreds to thousands (or more) compute servers and each compute server may receive requests from thousands or more client devices.

Each compute server may execute an object worker. As described above, each object worker includes a combination of an instantiation of a piece of code and an object that belongs to the instantiation of the piece of code. Each instance of an object worker has its own private and persistent data that the object worker can read and/or modify and which no other object worker can directly access. The piece of code can be, for example, a piece of JavaScript or other interpreted language, a WebAssembly (WASM) compiled piece of code, or other compiled code. In an embodiment, the piece of code is written against standard Web Platform APIs such as compliant with the W3C standard Service Worker API for receiving HTTP requests. An object worker locks the data such that it is the sole owner of the data while it is being executed. Other entities that wish to interact with the data send messages to the object worker that owns the data. In an embodiment, each instantiated object worker script is run in an isolated execution environment, such as run in an isolate of the V8 JavaScript engine. The isolated execution environment can be run within a single process. In an embodiment, the instantiated object worker scripts are not executed using a virtual machine or a container. In an embodiment, a particular object worker script is loaded and executed on-demand (when and only if it is needed) at a particular compute server of the distributed cloud computing network.

The origin server 180, which may be owned or operated directly or indirectly by a customer of the cloud computing platform, is a computing device on which a network resource resides and/or originates (e.g., web pages, images, word processing documents, PDF files movie files, music files, or other computer files). In an embodiment, the origin server 180 is not required such that a compute server can respond to a request without querying an origin server.

The control server 185 is operated by the cloud computing platform and provides a set of tools and interfaces for a customer to, among other things, configure object workers to be run in the cloud computing platform. The third-party device 190 is a computing device (e.g., laptop, workstation, smartphone, mobile phone, tablet, etc.) that is used by third-parties such as a customer, among other things, interact with the control server 185. For instance, the control server 185 may allow the customer to indicate how the data is to be split into one or more units.

The customer can split the data into units that tend to be accessed by the same client or sets of clients. This allows the object to naturally migrate to near where the client(s) are accessing the data thereby providing fast, low-latency access. The following are examples in how the data can be split. If the customer is providing a collaborative document editing system, each document of the system may be a separate object. If the customer is providing an online gaming service, each game session may be a separate object. For an online email service, each user's mailbox may be a separate object. For a calendar service, each user's calendar may be a separate object. For a team chat product, each channel may be a separate object.

The control server 185 may allow the customer to upload one or more object worker scripts and specify when the object worker script(s) are to be run. For instance, the customer may associate a rule that indicates when an object worker script is to be run. By way of example, the control server 185 may allow the customer to configure a URL matching pattern that indicates the URL(s) for which the object worker script is to run. The control server 185 may allow the customer to delete and update previously uploaded object worker script(s).

In an embodiment, the control server 185 deploys each object worker script to each of the compute servers 120A-N automatically (without the customer selecting which of the compute servers 120A-N in which to deploy the object worker script). In another embodiment, the control server 185 allows the customer to indicate which of the compute servers 120A-N are to be deployed a particular worker script. The control server 185 creates an identifier for each unique object worker script. In an embodiment, the identifier is created by hashing the content of the object worker script (e.g., using a cryptographic hash function such as SHA-256), where two scripts with identical content will have the same identifier even if uploaded by different customers and even if applied to different zones.

In an embodiment, the control server 185 allows a customer to provision the service to the cloud computing platform through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the control server 185 to change their authoritative name server to an authoritative name server of the cloud computing platform and/or change their zone file records to have their domain point to the compute servers.

In an embodiment, the control server 185 allows a customer and/or end user to configure policy for the object workers including an object worker instantiation policy, object worker access policy, an external communication policy, an encryption policy, and a logging policy as previously described.

At an operation 1, the compute server 120A receives a request from the client device 110A for an identified object. The request may be an HTTP request, HTTPS request, or other protocol request. In an embodiment, the compute server 120A receives this request because it is the closest one of the compute servers 120A-N to the client device 110A in terms of routing protocol configuration (e.g., BGP configuration) according to an anycast implementation as determined by the network. As an example, the request is an HTTP/S request for an object located at "example.com/object/1234". The origin server 180 may be the origin server for the domain "example.com."

Prior to the request being received, the client device 110A and/or the user of the client device 110A may be authenticated. For instance, the user may provide credentials that are authenticated by the system. The credentials may be for a particular hostname, which may correspond to the hostname of the request. For instance, the credentials may be for the hostname "example.com". In addition to authentication, roles may be determined for the particular client device 110A and/or user of the client device 110A.

The compute server 120A determines that the request is to be handled by an object worker. This determination may be made by the worker control 140A being executed by the compute server 120A. The worker control 140A may be a script that determines that the request is to be handled by an object worker. For instance, the script may determine an object ID for the requested object worker and forward the request to the appropriate instance of the object worker script. In another embodiment, the worker control 140A may analyze the request URL against a URL matching pattern configured for the zone to determine if an object worker is to handle the request. For instance, the request URL of "example.com/object/1234" may match a predefined matching pattern for determining that an object worker is to handle the request.

An object worker to handle the requested object may or may not be currently running and/or previously instantiated at the time the request is received at the compute server 120A. In an embodiment, a single instantiated object worker becomes the sole owner of the object for which it is handling while that object worker is executing. All requests are processed by that object worker. The worker control 140A checks the directory service 130 to determine if an object worker has been instantiated for the requested object and if so, the state of the object worker. The directory service 130 may store information that indicates whether the object worker is running, the location (e.g., which compute server) is running the object worker, and optionally the last region in which the requested object was running. A region is a group of compute servers that may be geographically near each other. A network partition may occur between regions (e.g., complete failure of communication between regions or very slow communication between regions).

If an object worker has not been previously instantiated for the requested object, a new object worker is instantiated for the requested object if policy allows for the object worker to be instantiated at the compute server 120A. If an object worker is currently running on the compute server that received the request, that object worker processes the request if allowed by policy. If an object worker is currently running on a different compute server than the one that received the request, the request may be transmitted to that different compute server for processing the object worker if allowed by policy. If an object worker for the requested object is not currently running and last was run in the same region as the compute server that received the request (and thus there is a low chance of a network partition), that compute server can instantiate the object worker for the requested object if allowed by policy. If an object worker for the requested object is not currently running and was last running in a different region as the compute server that received the request (and thus is an increased chance of a network partition), then the compute server that received the request may request that ownership of the object be transferred from that different region if allowed by policy.

In the example of FIG. 1, the worker control 140A accesses the directory service 130 at operation 2 and determines that an object worker for the requested object has not been previously instantiated. This may trigger the worker control 140A to call the policy worker control 142A to determine whether an object worker for the requested object is allowed to be instantiated at the compute server 120A according to policy. Thus, at operation 3, the policy worker control 142A determines whether a policy applies for the requested object and/or the requesting client. The policy worker control 142A may be a script that determines whether one or more policies are applicable and enforces any such policies. In an embodiment, the directory service 130 stores an indication of the one or more policies that apply for a domain and/or a particular object.

The rules governing which policies are to apply to which objects can be stored in different locations. As one example, rules that apply broadly (e.g., domain-wide rules) may be stored in a distributed and replicated key-value store (e.g., operating at each data center of the distributed cloud computing network) and rules that apply to a specific object may be stored in association with that object. Metadata that directs how the policy is applied may be stored along the storage of the object worker. Per user metadata may be stored with user records in the authentication system. In some cases, the policy developer may choose to store the metadata in external locations and the policy control worker may fetch the metadata.

Assuming that there is not a policy that prevents the object worker from being instantiated at the compute server 120A, the worker control 140A registers with the directory service 130 and instantiates an object worker 150 at operation 4. Registering may include generating an identifier for the object worker (if one does not exist) and associating the identifier with the location in which the object worker will execute. Registering may also include associating one or more policies for that specific object. In an alternative embodiment, the identifier is generated by the client device 110A, which can be derived from a string such that the same string always generates the same identifier, or which can be generated randomly which produces a unique identifier for the object. The client device 110A can convert the identifier into a string that it can store or transmit. Once the client device 110A has an identifier, it can access the object (assuming access is allowed by policy). If no such identifier exists, the identifier is created when first accessed. Alternatively, the client device 110A must explicitly request that the object is requested.

For instance, the worker control 140A associates an identifier for the object worker 150 with an identifier of the compute server 120A. The object worker 150 includes an object worker script instance 165 that is an instantiated object worker script and the object 170 and is associated with the policy 172. The object 170 corresponds to the requested object identified in the request in operation 1. The object worker script instance 165 can read and/or modify the object 170 and no other object worker can directly access the object 170.

Instantiating an object worker may include retrieving the object worker script that handles processing of the object and/or retrieving the object itself from the data store 160. In an embodiment, instantiation of the object worker may also include determining a leader and one or more followers to form a consensus group for the object. The object leader executes the instance of the object worker. The object leader replicates writes to the object follower(s). If, for instance, the object leader becomes unreachable (e.g., due to a hardware or software failure), the follower(s) may elect a new object leader. In the example of FIG. 1, the compute server 120B includes a follower object worker 195. In an embodiment, to be a leader or a follower, a particular compute server must be permitted to instantiate an object worker according to policy set for the object and/or hostname.

After the object worker 150 has been instantiated, it processes the request received from the client device 110A at operation 5. Processing the request may include reading and/or writing to the object 170. Processing the request may also include accessing the origin server 180 and/or other origin servers depending on the request. Processing the request may depend on one or more applicable policies. For instance, a policy may specify that the user of the client device 110A can only read data from the object 170 (i.e., the user cannot write data to the object 170). In such a case, the policy worker control 142A prevents writing to the object 170. As another example, a policy may specify a particular encryption and processing the request may include applying that particular encryption. As another example, a policy may specify what is to be logged (if anything) for the request. As another example, a policy may prevent the request from making an external communication.

After processing the request, the compute server 120A transmits a response to the request to the requesting client device 110A at operation 6. In an embodiment, if processing the request includes writing to the object 170, the write(s) are replicated to object followers that are compliant with the policy applicable to the object 170. Thus, at operation 7, which is optional in some embodiments, a write is replicated to the follower object worker 195 of the compute server 120B.

The compute server 120B receives a request from the client device 110B at operation 8 for the object 170. In an embodiment, the compute server 120B receives this request because it is the closest one of the compute servers 120A-N to the client device 110B in terms of routing protocol configuration (e.g., BGP configuration) according to an anycast implementation as determined by the network. As an example, the request is an HTTP/S request for the object located at "example.com/object/1234". At operation 9, the worker control 140B determines that the request is to be handled by an object worker. For instance, the worker control 140B may analyze the request URL against a URL matching pattern configured for the zone to determine if an object worker is to handle the request.

At operation 10, the worker control 140B accesses the directory service 130 to determine if an object worker has been instantiated for the requested object and if so, the state of the object worker. In this example, the object worker 150 is being executed by the compute server 120A at the time of the request in operation 8. Accordingly, the directory service 130 returns the location of where the object worker for the requested object is currently running (e.g., an identifier of the compute server 120A) to the worker control 140B at operation 11. This may trigger the worker control 140B to call the policy worker control 142B to determine whether the object worker 150 can be accessed for this request. Thus, at operation 12, the policy worker control 142B determines whether a policy applies for the requested object and/or the requesting client. In an embodiment, the directory service 130 stores an indication of the one or more policies that apply for a domain and/or a particular object.

Assuming that there is not a policy that prevents the object worker 150 from being accessed for the request received in operation 8, the worker control 140B transmits a request to the compute server 120A for the object worker 150 to process at operation 13. For instance, the worker control 140B may forward the request it received from the client device 110B in operation 8 to the compute server 120A for processing.

In an embodiment, the compute server 120A enforces policy upon receiving a request for an object worker. Thus, at operation 14, the policy worker control 142A determines whether a policy applies for the requested object and/or the requesting client. Assuming that the policy does not prevent the message from being processed at the object worker 150, the request is processed by the object worker 150 at operation 15, which may include reading and/or writing to the object 170 if policy permits. Processing the request at operation 15 may be like processing the request at operation 5.

After processing the request, the compute server 120A transmits a reply to the request to the compute server 120B at operation 16. In an embodiment, if processing the request includes writing to the object 170, the write(s) are replicated to the object followers if permitted by policy. Thus, at operation 17, which is optional in some embodiments, a write is replicated to the follower object worker 195 of the compute server 120B. At operation 18, the compute server 120A transmits a response to the request to the requesting client device 110B.

In an embodiment, the message for the object worker to process (e.g., the request) may be sent with the lookup request. In such an embodiment, instead of returning the location of the object worker, the directory service 130 forwards the message directly to the object worker for processing.

The object data is stored back to the data store 160. The object data may be periodically stored back to the data store 160. Alternatively, the object data is stored back to the data store 160 only after the object worker 150 has been idle for a predetermined period of time (e.g., has not received a request to process over that predetermined period of time) or when the compute server determines to abdicate ownership over the object (e.g., if the object worker 150 has not received a request to process over a predetermined period of time).

Although not illustrated in FIG. 1, the compute server 120A may stop the execution of the object worker 150 thereby abdicating ownership over the object 170. For instance, the compute server 120 may stop the object worker 150 if the object worker 150 has been idle for a predetermined period of time (e.g., if the object worker 150 has not received a request to process for the predetermined period of time). The compute server 120A may receive a request to transfer ownership over the object 170.

Figure 2:
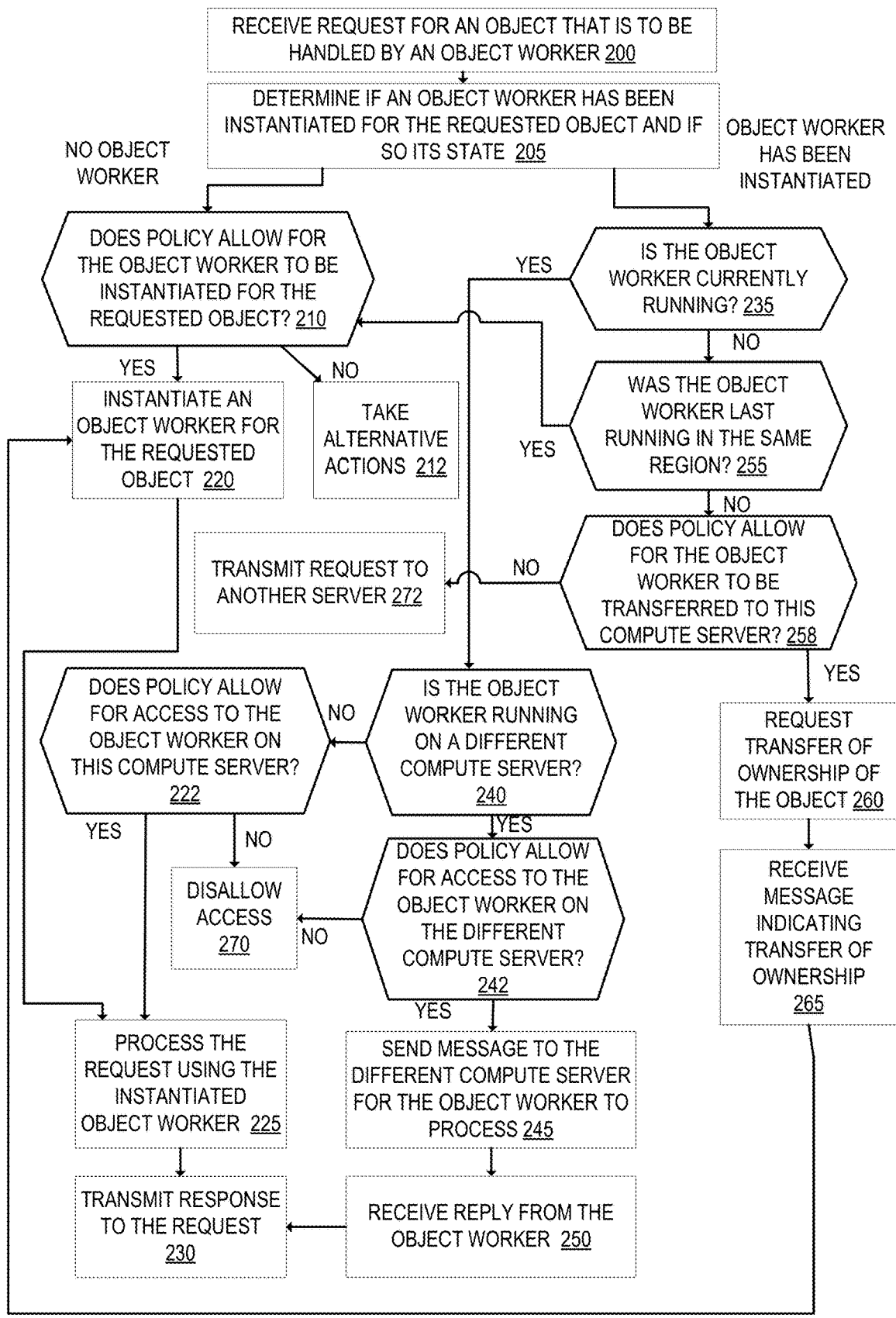
FIG. 2 is a flow diagram that illustrates exemplary operations for object worker processing according to an embodiment.

FIG. 2 is a flow diagram that illustrates exemplary operations for object worker processing according to an embodiment. The operations of FIG. 2 will be described with respect to HTTP/S request and responses. But the operations of FIG. 2 can be performed with different types of requests and responses.

At operation 200, a first one of multiple compute servers of a distributed cloud computing network receives a request for an object that is to be handled by an object worker. Referring to FIG. 1, the request is received by the compute server 120A from the client device 110A. The request may be an HTTP request, HTTPS request, or other protocol request. The compute server determines that the request is to be handled by an object worker. In an embodiment, this determination is made by a script that determines an object ID for the requested object and forwards the request to the appropriate instance of the object worker script. In another embodiment, this determination is made by analyzing the request URL against a URL matching pattern configured for the zone to determine if an object worker is to handle the request. To provide an example, the HTTP request is an HTTP GET method for "example.com/object/1234", which matches a predefined matching pattern for determining that an object worker is to handle the request.

Prior to the request being received, the client device 110A and/or the user of the client device 110A may be authenticated. For instance, the user may provide credentials that are authenticated by the system. The credentials may be for a particular hostname, which may correspond to the hostname of the request. For instance, the credentials may be for the hostname "example.com".

The distributed cloud computing network includes multiple compute servers including the first compute server. The compute servers are geographically distributed, and there may be hundreds or more compute servers. In an embodiment, the compute servers are anycasted to a same IP address, and the first compute server receives the request in operation 200 because the first compute server is the closest one of the compute servers to the client device making the request as determined by an anycast implementation. For instance, a DNS request for an address record of the zone "example.com" returns an anycasted IP address of the compute servers. Alternatively, the first compute server may receive the request because of a geographical load balancer routing the request to it.

Next, at operation 205, the first compute server determines whether an object worker has been instantiated for the requested object and if so, the state of the object worker. For example, the first compute server may use a directory service to look up whether an object worker has been instantiated for the requested object and if so, its state. The state information may indicate the location, if any, in which the object worker is running. For instance, the directory service may indicate an identifier of the compute server that is running the object worker for the requested object. The directory service may also indicate the last region in which the requested object was running. A region is a group of compute servers that may be geographically near each other.

The directory service may use a distributed hash table. As another example, a replicated service using eventual consistency may be used. Yet another example, a hierarchical directory where the directory service for any given object is another object worker that is identified from the object's ID may be used. Yet another example, the backing store itself may be used as the directory service by storing a file adjacent to the object and performing optimistic-concurrency transactions.

If an object worker has not been instantiated for the requested object, then operation 210 is performed. At operation 210, the first compute server determines whether policy allows for the object worker to be instantiated for the requested object at the first compute server. The policy may be associated with the object and/or the requesting user. For instance, the first compute server may access a policy associated with the object identified by the request and/or a policy associated with the requesting user. There may be one or more policies that are applicable to the object worker. The one or more policies specify the condition(s) in which an object worker can be instantiated and/or where the object worker can be instantiated for the requested object. The object worker instantiation policy may specify location(s) in which the object worker is allowed and/or not allowed to be instantiated, times in which the object worker is allowed and/or not allowed to be instantiated, characteristic(s) of the server and/or data center in which the object worker is allowed and or not allowed to be instantiated, location(s) of client devices that are allowed and/or not allowed to cause the object worker to be instantiated, and/or characteristic(s) of client devices that are allowed and/or not allowed to cause the object worker to be instantiated.

If policy does not allow for the object worker to be instantiated at the first compute server, then the first compute server takes alternative action(s) at operation 212. As an example alternative action, the first compute server may reject the request if policy does not allow for the object worker to be instantiated at the first compute server. For instance, if the first compute server is in a jurisdiction that is not allowed to instantiate the object worker, the first compute server may reject the request. As another exemplary alternative action, the first compute server may determine whether any other compute server of the distributed cloud computing network is permitted by policy to instantiate the object worker for the requested object, and if so, cause one of those compute servers to instantiate the object worker. In such a case, the first compute server may transmit the request to another compute server for processing the request or redirect the client to issue the request to another compute server for processing.

If policy allows for the object worker to be instantiated at the first compute server, then operation 220 is performed. At operation 220, the first compute server instantiates an object worker for the requested object. Instantiating the object worker for the requested object may include determining what entity is going to execute the object worker and may include determining the entities that will object worker followers. In an embodiment, the first compute server is determined to execute the object worker because it is the one that received the request in operation 210. A set of one or more object worker followers may be determined. The first compute server may select other compute server(s) to be object worker followers. In an embodiment, the set of object worker followers are each located in a different data center than the first compute server. The set of object worker followers are typically located in the same region as the first compute server. Instantiating the object worker may also include retrieving the object from storage or from its origin server, and/or retrieving the object worker script from storage or from its origin server. Instantiating the object worker includes registering the object worker with the directory service (e.g., indicating that the object worker is executing on the first compute server).

Next, at operation 225, the object worker for the requested object processes the request. Processing the request may include reading and/or writing to the object. Processing the request may also include accessing the origin server 180 and/or other origin servers depending on the request. Processing the request may depend on one or more applicable policies. For instance, a policy may specify that the user of the client device 110A can only read data from the object 170 (i.e., the user cannot write data to the object 170). In such a case, the policy worker control 142A prevents writing to the object 170. As another example, a policy may specify a particular encryption and processing the request may include applying that particular encryption. As another example, a policy may specify what is to be logged (if anything) for the request. As another example, a policy may prevent the request from making an external communication.

Next, at operation 230, the first compute server transmits a response to the request to the requesting client device. In an embodiment, if processing the request includes writing to the object, the write(s) are replicated to the object follower (s) if policy permits.

If an object worker has been instantiated for the requested object, at operation 235 the first compute server determines, from the state information of the object worker, whether the object worker for the requested object is currently running. If the object worker is not currently running, then operation 255 is performed. If the object worker is currently running, then at operation 240 the first compute server determines, from the state information of the object worker, whether the object worker is running on a different compute server. If the object worker is not running on a different compute server (meaning it is running on the first compute server), then operation 222 is performed. If the object worker is running on a different compute server, then operation 242 is performed.

At operation 222, the first compute server determines whether policy allows for access to the object worker on the first compute server. The policy may be associated with the object and/or the requesting user. For instance, the first compute server may access a policy associated with the object identified by the request and/or a policy associated with the requesting user. The object worker access policy specifies the condition(s) in which an instantiated object worker can be accessed. The object worker access policy may be triggered when a request for access to an object policy is received. The object worker access policy may specify location(s) of client devices for which access to the object worker is allowed and/or not allowed, and/or characteristic(s) of client devices for which access to the object worker is allowed and/or not allowed. The location may be legal jurisdiction(s), a region, and/or a general location. The location of the client device may be determined through GPS coordinates provided by the client device or through geolocation databases based on IP address. The characteristic(s) of the client devices may include: the type of client device, the client device manufacturer, the user agent, whether a user of a client device has been authenticated, the access rights associated with an authenticated user of a client device, IP address of the client device, and/or device posture of the client device. By way of example, the object worker access policy may specify that only clients from a certain jurisdiction (e.g., the United States) can access (e.g., interact with by sending a message to the object worker and/or receiving a message from the object worker). As another example, the object worker access policy may specify that only authenticated clients with particular credentials are allowed access to the object worker. If the first compute server determines that policy allows for access to the object worker, then operation 225 is performed. If the first compute server determines that policy does not allow access to the object worker for this request, then operation 270 is performed where the first compute server disallows access. The first compute server may log an indication of the disallowed access.

At operation 242 where the object worker is running on a different compute server, the first compute server determines whether policy allows for access to the object worker for this request at the different compute server. The policy may be associated with the object and/or the requesting user as described above with respect to operation 222. For instance, a policy may specify that only clients from a certain jurisdiction (e.g., the United States) can access (e.g., interact with an object worker by sending a message and/or receiving a message from the object worker), and if that client is not from that jurisdiction, the first compute server may determine to disallow access to that object worker (e.g., prevent the message from being sent to the different compute server on which the object worker is instantiated). If the first compute server determines that policy allows for access to the object worker on the different compute server, operation 245 is performed. If the first compute server determines that policy does not allow for access to the object worker on the different compute server, operation 270 is performed where the first compute server disallows access. The first compute server may log an indication of the disallowed access.

At operation 245, the first compute server sends a message to the different compute server for the object worker to process. This message may be the request that is received in operation 200, for example. The different compute server processes the request, which may include reading and/or writing to the object. The different compute server may receive the request and perform operations like that of FIG. 2 starting at operation 200. Assuming that the different compute server processes the request, at operation 250, the first compute server receives a reply from the object worker on the different compute server in response to the request. Then, at operation 230, the first compute server transmits a response to the request to the requesting client device.

Although FIG. 2 describes an embodiment where the first compute server allows access to an object worker that is instantiated at a different compute server only after determining that policy permits that object worker to be accessed, in another embodiment, the first compute server transmits the message to the different compute server and that different compute server determines whether policy allows the object worker to process the message.

The compute servers may be logically separated into regions. A network partition may exist or come into existence between regions that affects communication between regions (e.g., a complete communication block or very slow communication). In an embodiment, an object worker can run in only a single region at a time. In an embodiment, because a controlling object worker is to run in only a single location, a determination is made whether the object worker was last running in a different region as the compute server and if it was, a transfer of ownership must occur. This prevents a compute server in one region from running the object worker concurrently with a compute server in a different region. Thus, at operation 255, the first compute server determines, from the state information of the object worker, if the object worker was last running in the same region as the first compute server. If the object worker was last running in the same region as the first compute server, then operation 210 is performed where the first compute server determines whether policy allows for the object worker to be instantiated for the requested object at the first compute server. If, however, the object worker was last running in a different region as the first compute server, then operation 258 is performed.

At operation 258, the first compute server determines whether policy allows for the object worker to be transferred to the first compute server. The policy may be associated with the object and/or the requesting user. These one or more policies may be the same as the one or more policies that specify the condition(s) in which an object worker can be instantiated and/or where the object worker can be instantiated as previously described. As an example, a policy may be a jurisdictional policy that specifies the location of where the object worker is allowed and/or not allowed. If policy does not allow for the object worker to be transferred to the first compute server, then operation 272 is performed. If policy allows for the object worker to be transferred to the first compute server, then operation 260 is performed.

At operation 272 (policy does not allow for the object worker to be transferred to the first compute server), the first compute server transmits the request to another compute server of the distributed cloud computing network. In an embodiment, the first compute server transmits the request to a compute server in the region that last ran the object worker. That compute server may then perform operations like that of FIG. 2 starting at operation 200.

At operation 260 (policy allows for the object worker to be transferred to the first compute server), the first compute server requests a transfer of ownership of the object from that different region to the region of the first compute server. The first compute server may transmit a message to the compute server that is currently listed in the directory service as owning the object requesting transfer of ownership of the object.

In an embodiment, the transfer of ownership may be denied. In such a case, the other compute server may instantiate the object worker for the object. The first compute server may then transmit a message to that compute server for the object worker to process like in operation 245.

In an embodiment, if the first compute server does not receive a response to the requested transfer (e.g., a network partition has prevented communication between the regions), then the first compute server does not instantiate the object worker and process the request. In such a case, the first compute server may transmit an error message to the requesting client device.

If transfer of ownership to the first compute server is agreed upon, then the first compute server receives a message indicating transfer of ownership at operation 265. The first compute server then instantiates an object worker for the requested object at operation 220.

Although FIG. 2 shows an embodiment where migration of the object worker from one region to another may occur upon a single request being received, in other embodiments the migration occurs responsive to determining that it will be beneficial over the long term to migrate the object worker. For instance, a set of parameters including the origination of the requests (e.g., compute server and/or region) over a period of time may be tracked and the object worker may not be migrated from the region where the object last ran if that region has more requests (optionally over some threshold percent) than the current region. In such an embodiment, with reference to FIG. 2, if the compute server determines that the object worker was not last running in the same region and it determines that it is not beneficial to migrate the object worker, the compute server transmits the request to a compute server in the region where the last object ran (e.g., like operation 272) and operations 258, 260, and 265 are not performed.

In an embodiment, the object worker is automatically migrated to be close to the objects with which it commonly communicates. This automatic migration may be a natural consequence of a compute server receiving a request that is to be handled by an object worker and that object worker is not currently instantiated (even if it was last running on a different compute server). As another example, the object worker may be automatically migrated based on a set of one or more parameters.

For instance, the system may track the origination of the requests (e.g., compute server and/or region) over a period of time and automatically migrate the object worker to the originator with the highest number of requests. To track the origination of the requests, a compute server that receives a request that is to be handled by an object worker causes a request received number to be incremented. The request received number may be stored in the directory service 130, for example. A number for the particular compute server and/or an aggregate number for the region may be incremented.

As another example, the system may determine the location of the object worker (e.g., which compute server or region) that has the minimum total latency and automatically migrate the object worker to that location. The minimum total latency may be determined by analyzing the latency to process each request (which may be determined with network probes). For instance, statistics may be gathered on the locations where requests are originating and a determination of the optimal location in which to serve the traffic is made based on the statistics. In an embodiment, this determination is performed by measuring the latency from each compute server or region to each client, computing the average latency weighted by the amount of traffic (e.g., the number of requests) each of those clients sent, and selecting the compute server or region that has the lowest average. In another embodiment, this determination is made by plotting the client's location on a map, computing the average latency weighted by the amount of traffic (e.g., the number of requests) between the locations, and then selecting the closest compute server or region to that average. As another example, the system may determine the location of the object worker (e.g., the location of the compute server or region) that has the minimum total of the squares of the latency.

As another example, the system may automatically migrate the object worker based on historical and/or predicted requests to be handled by the object worker. As another example, the system may automatically migrate the object worker based on which compute server or region ingresses the most total traffic for that object worker.

In an embodiment, the object worker is automatically migrated to be close to an external server or other resource with which that object worker frequently interacts, such as the origin server. For instance, if the object worker makes more requests to the origin than to client devices, the object worker may be migrated to a compute server of the distributed cloud computing network that is close to the origin rather than to any particular client. As an example, if the object worker is a database connector that is accessing a database stored at an external data base server, the object worker may be migrated to a compute server that is physically close to the database server.

Figure 3:
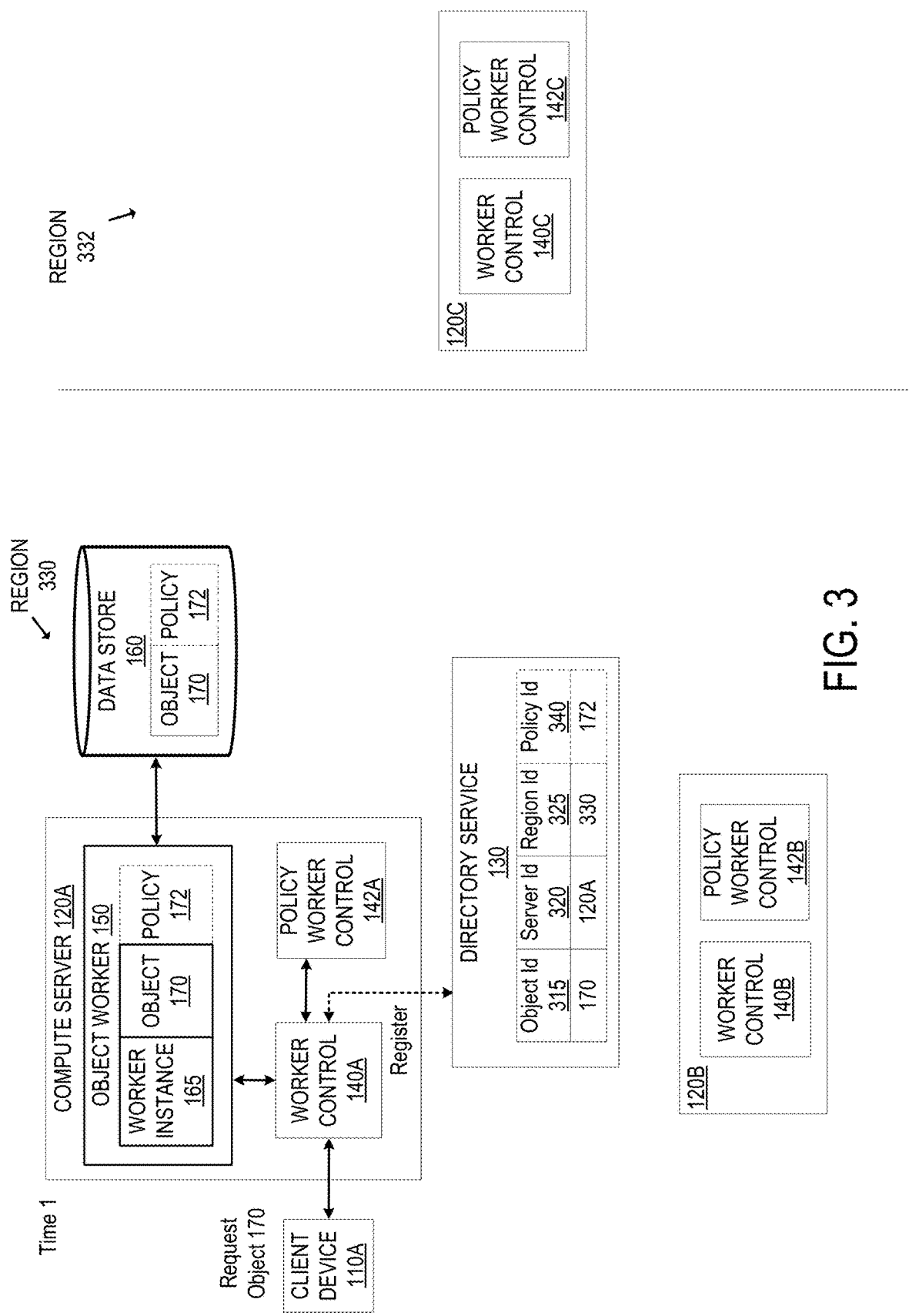
FIG. 3 illustrates a first time period showing an object worker being automatically migrated according to an embodiment.
Figure 4:
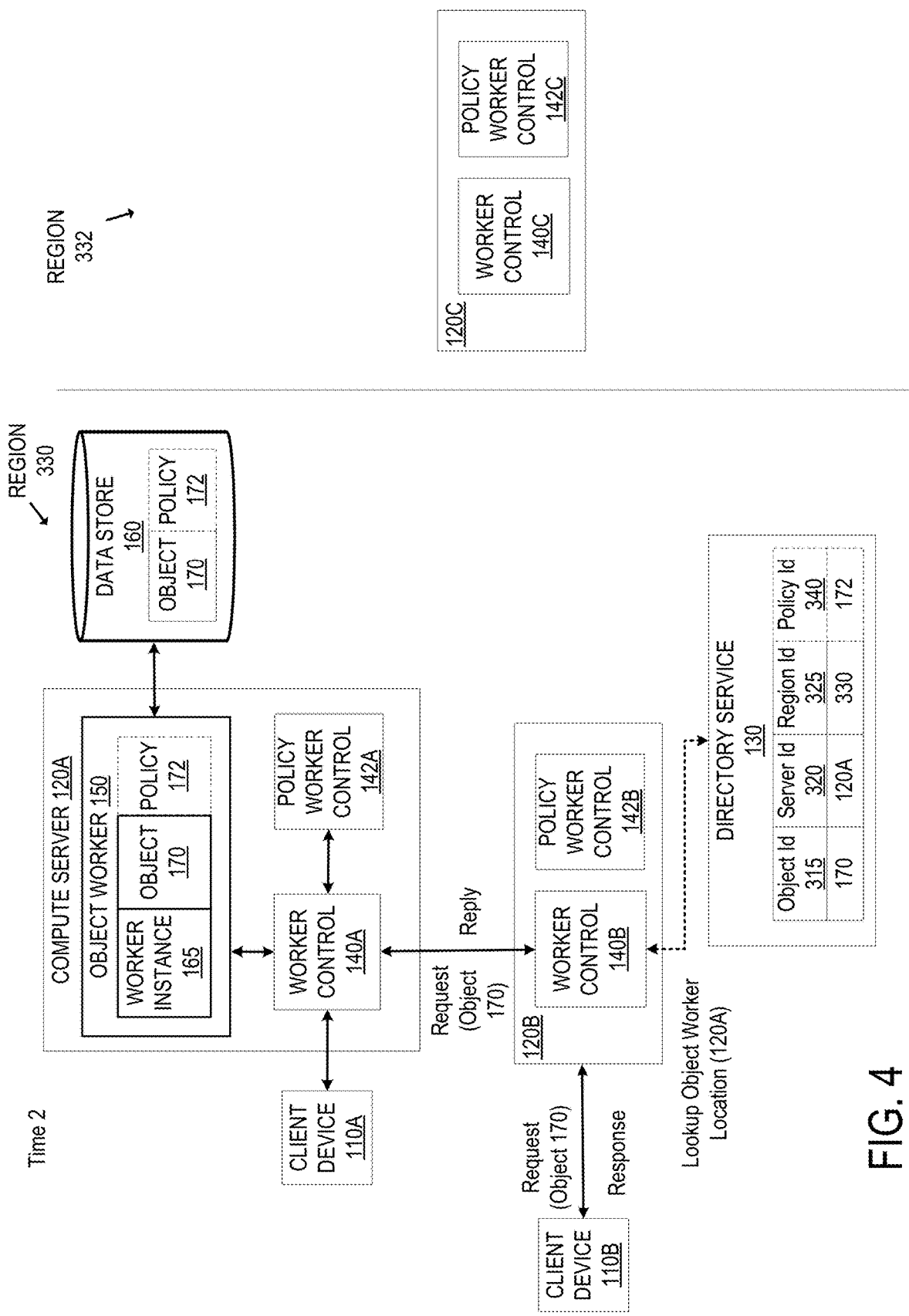
FIG. 4 illustrates a second time period showing an object worker being automatically migrated according to an embodiment.
Figure 5:
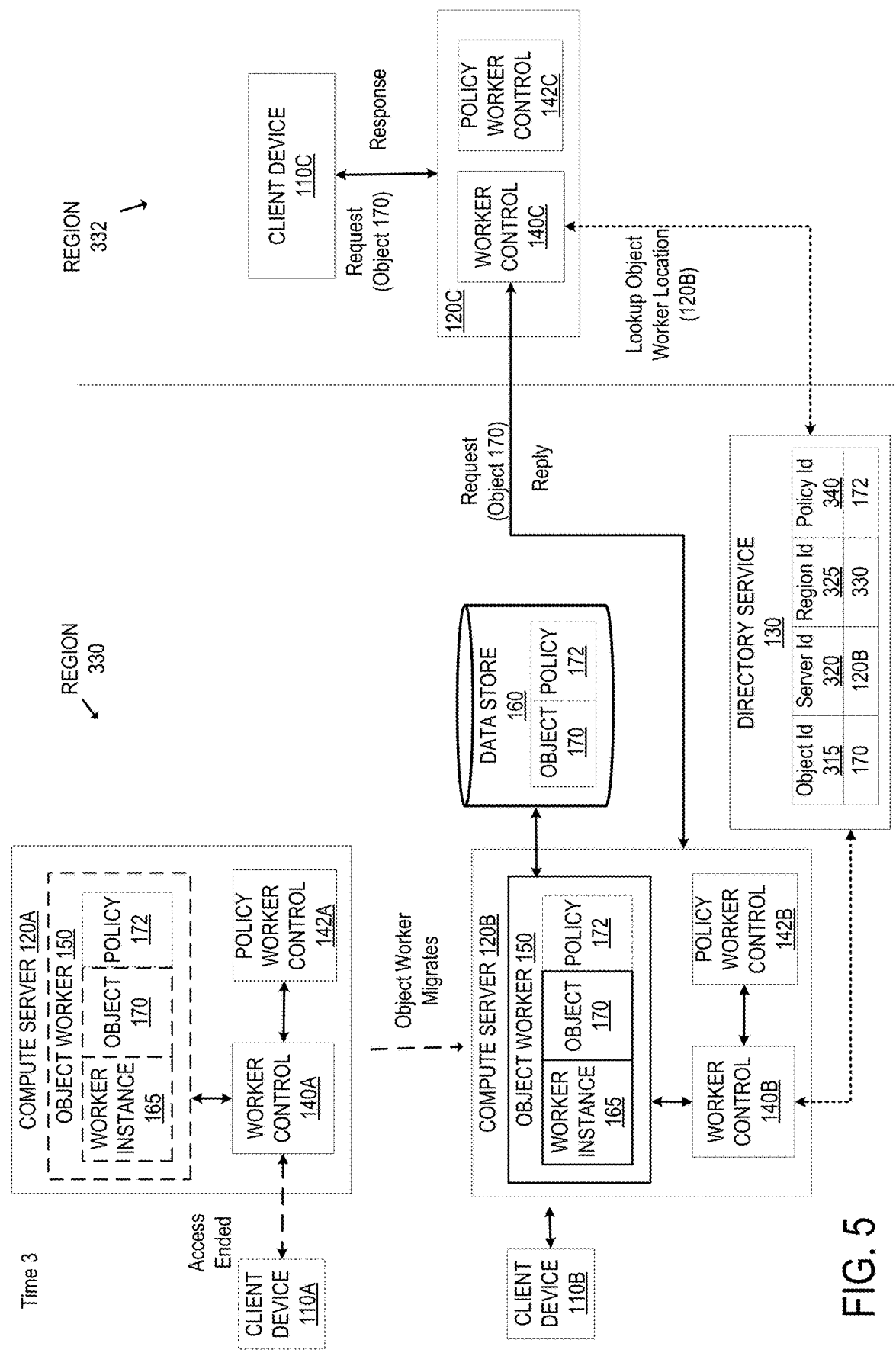
FIG. 5 illustrates a third time period showing an object worker being automatically migrated according to an embodiment.

FIGS. 3-5 illustrate an object worker being automatically migrated according to an embodiment. FIGS. 3-5 include the compute servers 120A-C of the distributed cloud computing network. FIG. 3 illustrates a time 1 where the object worker 150 is instantiated and running on the compute server 120A. The object worker 150 may be instantiated as a result of a request from the client device 110A for the object 170. The compute server 120A may receive the request from the client device 110A because it is the closest one of the compute servers 120A-N to the client device 110A in terms of routing protocol configuration (e.g., BGP configuration) according to an anycast implementation as determined by the network.

The worker control 140A accesses the directory service 130 and determines that an object worker for the object 170 has not been instantiated and then registers an object worker with the directory service 130. Registering the object worker for the object 170 may include generating an identifier for the requested object and associating the identifier with the location in which the object worker will execute. The generated object identifier is made with sufficient entropy that there will not be collisions. In an embodiment, the generated object identifier encodes an identifier of the initial consensus group or the server that is executing the object worker such that requests addressed to the object can be routed even if the directory has not yet been updated.

As illustrated in FIG. 3, the directory service 130 includes an object identifier field 315, a server identifier field 320, a region identifier field 325, and in some embodiments a policy identifier field 340. The object identifier field 315 indicates the identifier of the object. In this case, the identified object corresponds to the object 170. The server identifier field 320 indicates the server that is executing the object worker that owns the object 170. In this case, the server identifier corresponds to the compute server 120A. The region identifier field 325 indicates the region in which the object worker for the object was last instantiated. In this example, the region identifier field indicates the region 330 (which includes the compute server 120A). The policy identifier field 340 identifies the one or more policies that are applicable for the object. In this example, the policy identifier corresponds to the policy 172. Although not illustrated in FIG. 3, the directory service 130 may include an identifier of the leader and identifier(s) of the follower(s). The form of the directory service 130 as illustrated in FIG. 3 is exemplary, and the directory service may take other forms and/or structure. Although FIG. 3 shows the directory service 130 including a policy identifier field, in other embodiments the policy indication is stored in the data store 160 associated with the particular object.

At the time 1, the client device 110A is the only client device that is interacting with the object 170. At a time 2, illustrated in FIG. 4, the client device 110B is requesting to interact with the object 170 while the object worker 150 is still instantiated on the compute server 120. The compute server 120B receives the request for the object 170 from the client device 110B. The compute server 120B may receive the request for the object 170 from the client device 110B (as opposed to, for example, the compute server 120A) because it is the closest one of the compute servers 120A-N to the client device 110B in terms of routing protocol configuration (e.g., BGP configuration) according to an anycast implementation as determined by the network. The worker control 140B accesses the directory service 130 for the requested object and determines that an object worker for object 170 is instantiated on the compute server 120A. The worker control 140B transmits a message to the compute server 120A (received by the worker control 140A) for the object worker 150 to process. The message may be similar to the request received from the client device 110B. The object worker 150 processes the request which may include reading and/or writing to the object 170. The worker control 140A transmits a reply to the request that is received by the worker control 140B. The worker control 140B generates a response based on the reply from the worker control 140A and transmits the response to the client device 110B.

Sometime after time 2, the access to the object 170 for the client device 110A ends. That is, the client device 110A is no longer interacting with the object 170. For instance, the browser of the client device 110A may have closed or navigated away from a page that includes the object 170. If no other client devices are interacting with the object 170, the object worker 150 may be subject for migration to another compute server. At a time 3, illustrated in FIG. 5, access to the object 170 has ended for the client device 110A and the object worker 150 has migrated to the compute server 120B. The client device 110B is interacting with the object 170 at the time 3. The directory service 130 is modified to specify that the compute server 120B has control of the object 170. The object 170 may be pushed backed to the data store 160.

In an embodiment, if the compute server that controls the object determines to abdicate ownership (e.g., if the object has been idle for a predetermined period of time), it removes itself as owner of the object from the directory service 130 (after processing any requests that may be pending for the object). The compute server may also push the object back to long-term storage. This allows for another compute server to take ownership of the object. For instance, the compute server 120A may push the object 170 back to the data store 160 and cause the directory service 130 to specify that it is not the owner of the object 170.

In an embodiment, the compute server that controls the object maintains a list of other compute server(s) that request interactions with the object. For instance, the compute server 120A may maintain a list that indicates that the compute server 120B has requested an interaction with the object 170 (through the client device 110B). If the compute server that controls the object determines to abdicate ownership (e.g., if access to the object from locally connected client devices has been idle for some time), the compute server may transmit a message to one or more of the compute servers on the list, where the message indicates that the compute server is abdicating ownership. The other compute server(s) may respond to this message and request ownership of the object (e.g., if a client device is accessing the object).

It may be possible that a previous object owner may receive a request for the object worker before the directory service 130 has finished updating. In such a case, the previous object owner may redirect the request to the new object owner.

FIG. 5 also illustrates that a client device 110C that is located in a first region 332 may interact with an object 170 that is located in a second region 330. The compute server 120C, of the region 332, receives the request for the object 170 from the client device 110C. The compute server 120C may receive the request for the object 170 from the client device 110C (as opposed to, for example, the compute servers 120A or 120B) because it is the closest one of the compute servers 120A-N to the client device 110C in terms of routing protocol configuration (e.g., BGP configuration) according to an anycast implementation as determined by the network. The worker control 140C accesses the directory service 130 for the requested object and determines that an object worker for object 170 is instantiated on the compute server 120B. The policy worker control 142C accesses the policy for the object and determines whether the object can be accessed. Assuming that the policy allows for the object to be accessed for this request, the worker control 140C transmits a message to the compute server 120B (received by the worker control 140B) for the object worker 150 to process. The message may be similar to the request received from the client device 110C. The object worker 150 processes the request which may include reading and/or writing to the object 170. The worker control 140B transmits a reply to the request that is received by the worker control 140C. The worker control 140C generates a response based on the reply from the worker control 140B and transmits the response to the client device 110C.

The example illustrated in FIGS. 3-5 assume that policy has allowed the migration of the object worker from the compute server 120A to the compute server 120B. If, for example, the compute server 120B was not permitted to instantiate the object worker 150 due to policy, the object worker would not be migrated from the compute server 120A to the compute server 120B.

Figure 6:
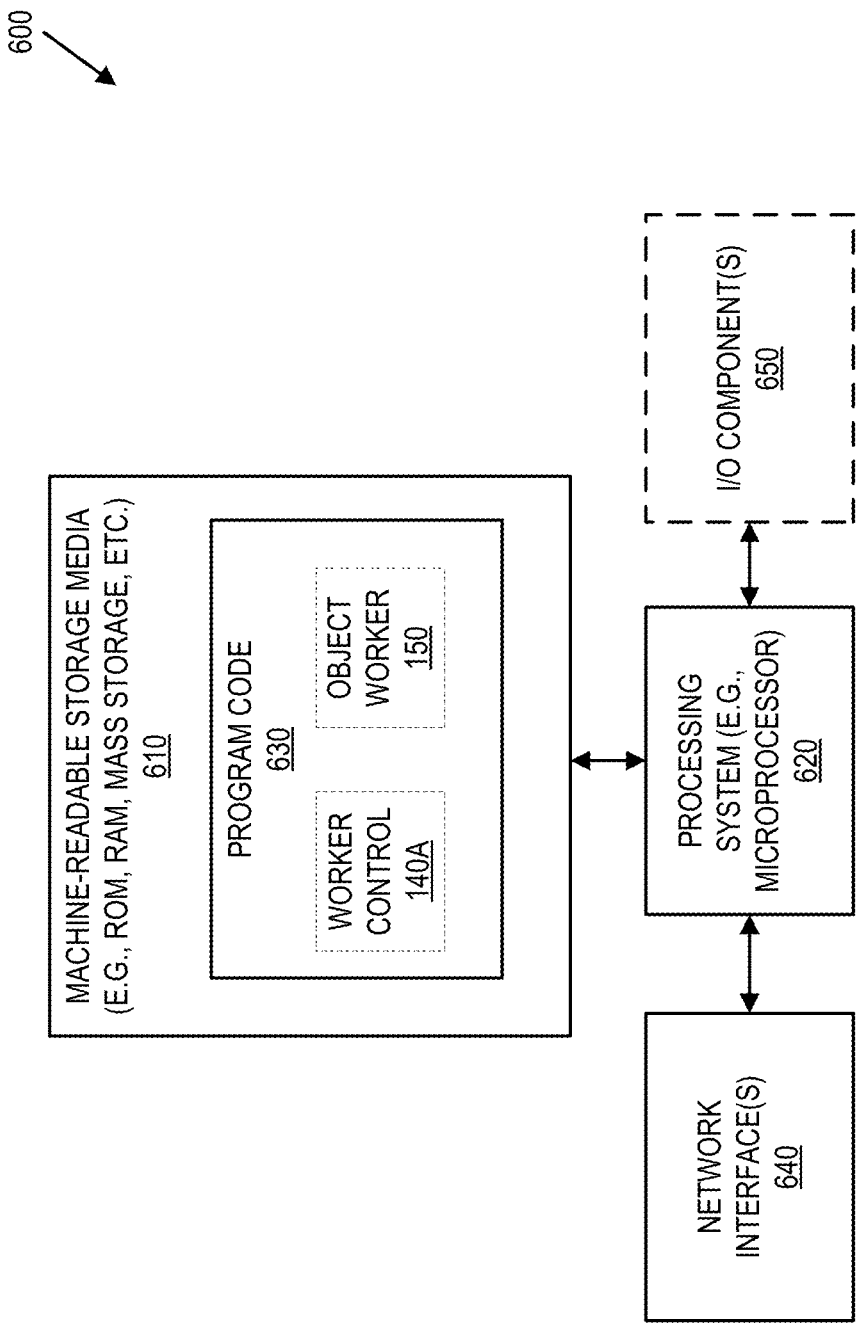
FIG. 6 is a block diagram illustrating a data processing system that can be used in an embodiment.

FIG. 6 illustrates a block diagram for an exemplary data processing system 600 that may be used in some embodiments. One or more such data processing systems 600 may be utilized to implement the embodiments and operations described with respect to the compute servers and/or client devices. Data processing system 600 includes a processing system 620 (e.g., one or more processors and connected system components such as multiple connected chips).

The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals), which is coupled to the processing system 620. For example, the depicted machine-readable storage media 610 may store program code 630 that, when executed by the processor(s) 620, causes the data processing system 600 to execute the worker control 140A, the policy worker control 142A, the object worker 150, and/or any of the operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). The data processing system 600 may also include one or more input or output ("I/O") components 650 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 600, and, in certain embodiments, fewer components than that shown in One or more buses may be used to interconnect the various components shown in FIG. 6.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals-such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments, such order is exemplary (e.g., alternative embodiments may perform the operations in a different order, combine certain operations, overlap certain operations, etc.).

While several embodiments have been described, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   instantiating a first object worker on a first compute server of a plurality of compute servers of a distributed cloud computing network, wherein the first object worker is associated with a first object, and wherein the first object worker includes a single instantiation of a first piece of code that solely controls reading and writing to the first object;
   receiving, at a first compute server, a first request for the first object worker to send a first communication with the first object to a first asset that is on a first network that is external to the distributed cloud computing network;
   accessing a first set of one or more policies that are applicable for processing the first object, wherein the first set of one or more policies include an external communication policy;
   determining, based on an external communication policy associated with the first object worker, that the first object worker is not allowed to send the first communication with the first object to the first asset that is on the first network that is external to the distributed cloud computing network, and responsive to this determination, preventing the first object worker from sending the first communication with the first object to the first asset that is on the first network that is external to the distributed cloud computing network;
   receiving, at the first compute server, a second request for the first object worker to send a second communication with the first object to a second asset that is on a second network that is external to the distributed cloud computing network;
   accessing the first set of one or more policies that are applicable for processing the first object; and
   determining, based on the external communication policy associated with the first object worker, that the first object worker is allowed to send the second communication with the first object to the second asset that is on the second network that is external to the distributed cloud computing network, and responsive to this determination, allowing the first object worker to send the second communication with the first object to the second asset.

2. The method of claim 1, wherein the external communication policy specifies a set of one or conditions that control whether communication can be sent to assets on networks external to the distributed cloud computing network.

3. The method of claim 1, further comprising:
   receiving, at the first compute server, a third request for the first object worker to second a third communication with the first object to a second object worker that is associated with another organization or domain compared to the first object worker;
   accessing the first set of one or more policies that are applicable for processing the first object; and
   determining, based on the external communication policy associated with the first object worker, that the first object worker is not allowed to send the third communication with the first object to the second object worker, and responsive to this determination, preventing the first object worker from sending the third communication with the first object to the second object worker.

4. The method of claim 1, further comprising:
receiving, at the first compute server, a third request for the first object worker to second a third communication with the first object to a second object worker that is associated with another organization or domain compared to the first object worker;
accessing the first set of one or more policies that are applicable for processing the first object; and
determining, based on the external communication policy associated with the first object worker, that the first object worker is allowed to send the third communication with the first object to the second object worker and responsive to this determination, transmitting the third communication with the first object from the first object worker to the second object worker.

5. The method of claim 1, wherein the first set of one or more policies are defined by an owner of the first object.

6. The method of claim 1, wherein the first set of one or more policies are defined by an end user.

7. A non-transitory machine-readable storage medium that provides instructions that, if executed by a processor, will cause said processor to carry out the operations comprising:
instantiating a first object worker on a first compute server of a plurality of compute servers of a distributed cloud computing network, wherein the first object worker is associated with a first object, and wherein the first object worker includes a single instantiation of a first piece of code that solely controls reading and writing to the first object;
receiving, at a first compute server, a first request for the first object worker to send a first communication with the first object to a first asset that is on a first network that is external to the distributed cloud computing network;
accessing a first set of one or more policies that are applicable for processing the first object, wherein the first set of one or more policies include an external communication policy;
determining, based on an external communication policy associated with the first object worker, that the first object worker is not allowed to send the first communication with the first object to the first asset that is on the first network that is external to the distributed cloud computing network, and responsive to this determination, preventing the first object worker from sending the first communication with the first object to the first asset that is on the first network that is external to the distributed cloud computing network;
receiving, at the first compute server, a second request for the first object worker to send a second communication with the first object to a second asset that is on a second network that is external to the distributed cloud computing network;
accessing the first set of one or more policies that are applicable for processing the first object; and
determining, based on the external communication policy associated with the first object worker, that the first object worker is allowed to send the second communication with the first object to the second asset that is on the second network that is external to the distributed cloud computing network, and responsive to this determination, allowing the first object worker to send the second communication with the first object to the second asset.

8. The non-transitory machine-readable storage medium of claim 7, wherein the external communication policy specifies a set of one or conditions that control whether communication can be sent to assets on networks external to the distributed cloud computing network.

9. The non-transitory machine-readable storage medium of claim 7, wherein the operations further comprise:
receiving, at the first compute server, a third request for the first object worker to second a third communication with the first object to a second object worker that is associated with another organization or domain compared to the first object worker;
accessing the first set of one or more policies that are applicable for processing the first object; and
determining, based on the external communication policy associated with the first object worker, that the first object worker is not allowed to send the third communication with the first object to the second object worker, and responsive to this determination, preventing the first object worker from sending the third communication with the first object to the second object worker.

10. The non-transitory machine-readable storage medium of claim 7, wherein the operations further comprise:
receiving, at the first compute server, a third request for the first object worker to second a third communication with the first object to a second object worker that is associated with another organization or domain compared to the first object worker;
accessing the first set of one or more policies that are applicable for processing the first object; and
determining, based on the external communication policy associated with the first object worker, that the first object worker is allowed to send the third communication with the first object to the second object worker and responsive to this determination, transmitting the third communication with the first object from the first object worker to the second object worker.

11. The non-transitory machine-readable storage medium of claim 7, wherein the first set of one or more policies are defined by an owner of the first object.

12. The non-transitory machine-readable storage medium of claim 7, wherein the first set of one or more policies are defined by an end user.

13. A first compute server, comprising:
a processor; and
a non-transitory machine-readable storage medium coupled to the processor, wherein the non-transitory machine-readable storage medium stores instructions that, when executed by the processor, causes the server to perform operations including:
instantiate a first object worker on the first compute server of a plurality of compute servers of a distributed cloud computing network, wherein the first object worker is associated with a first object, and wherein the first object worker includes a single instantiation of a first piece of code that solely controls reading and writing to the first object;
receive, at the first compute server, a first request for the first object worker to send a first communication with the first object to a first asset that is on a first network that is external to the distributed cloud computing network;
access a first set of one or more policies that are applicable for processing the first object, wherein the first set of one or more policies include an external communication policy;

determine, based on an external communication policy associated with the first object worker, that the first object worker is not allowed to send the first communication with the first object to the first asset that is on the first network that is external to the distributed cloud computing network, and responsive to this determination, prevent the first object worker from sending the first communication with the first object to the first asset that is on the first network that is external to the distributed cloud computing network;

receive, at the first compute server, a second request for the first object worker to send a second communication with the first object to a second asset that is on a second network that is external to the distributed cloud computing network;

access the first set of one or more policies that are applicable for processing the first object; and determine, based on the external communication policy associated with the first object worker, that the first object worker is allowed to send the second communication with the first object to the second asset that is on the second network that is external to the distributed cloud computing network, and responsive to this determination, allowing the first object worker to send the second communication with the first object to the second asset.

14. The first compute server of claim 13, wherein the external communication policy specifies a set of one or conditions that control whether communication can be sent to assets on networks external to the distributed cloud computing network.

15. The first compute server of claim 13, wherein the operations further include:

receive, at the first compute server, a third request for the first object worker to second a third communication with the first object to a second object worker that is associated with another organization or domain compared to the first object worker;

access the first set of one or more policies that are applicable for processing the first object; and determine, based on the external communication policy associated with the first object worker, that the first object worker is not allowed to send the third communication with the first object to the second object worker, and responsive to this determination, prevent the first object worker from sending the third communication with the first object to the second object worker.

16. The first compute server of claim 13, wherein the operations further include:

receive, at the first compute server, a third request for the first object worker to second a third communication with the first object to a second object worker that is associated with another organization or domain compared to the first object worker;

access the first set of one or more policies that are applicable for processing the first object; and determine, based on the external communication policy associated with the first object worker, that the first object worker is allowed to send the third communication with the first object to the second object worker and responsive to this determination, transmit the third communication with the first object from the first object worker to the second object worker.

17. The first compute server of claim 13, wherein the first set of one or more policies are defined by an owner of the first object.

18. The first compute server of claim 13, wherein the first set of one or more policies are defined by an end user.

* * * * *